Patented Nov. 21, 1939

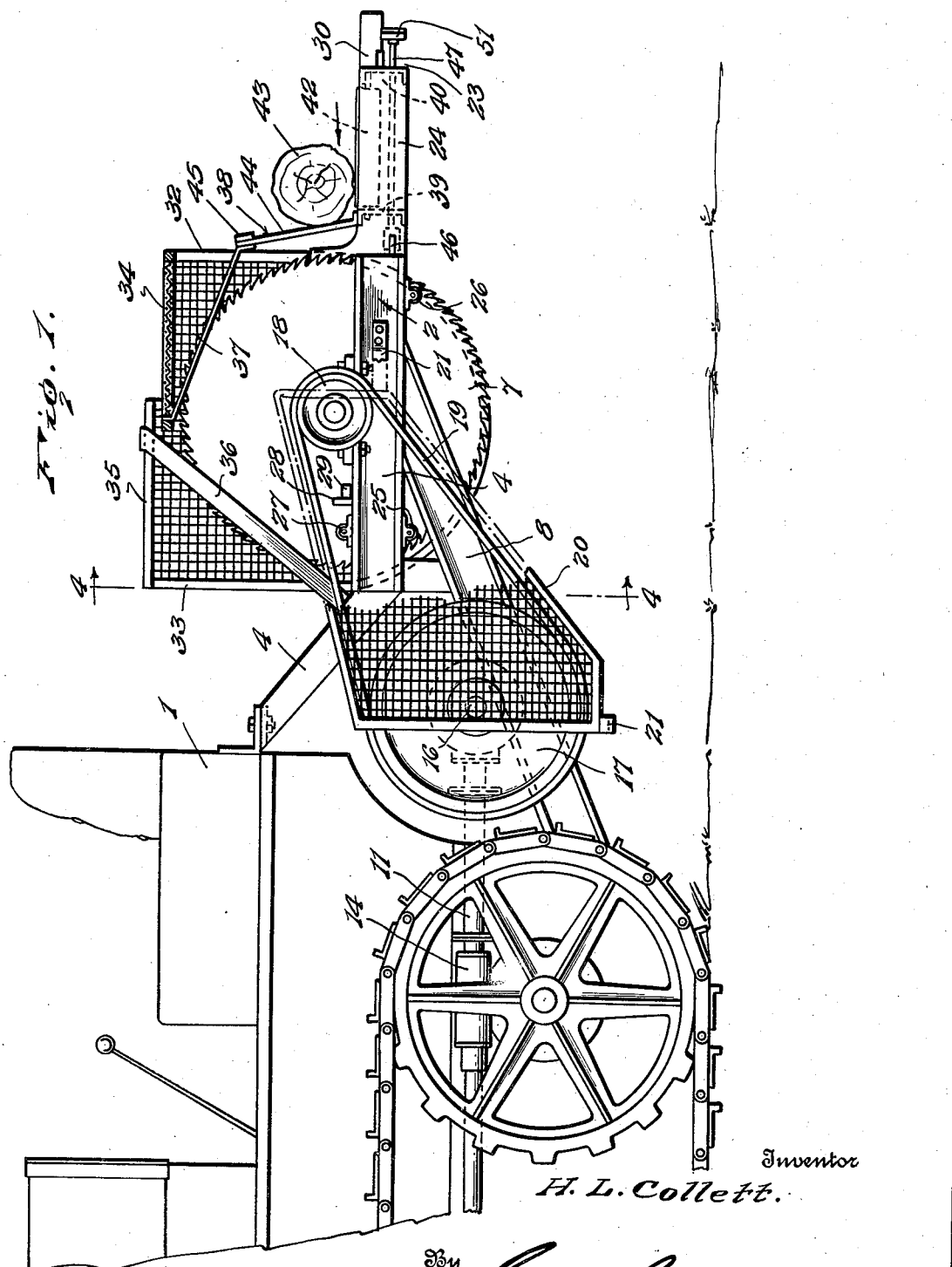

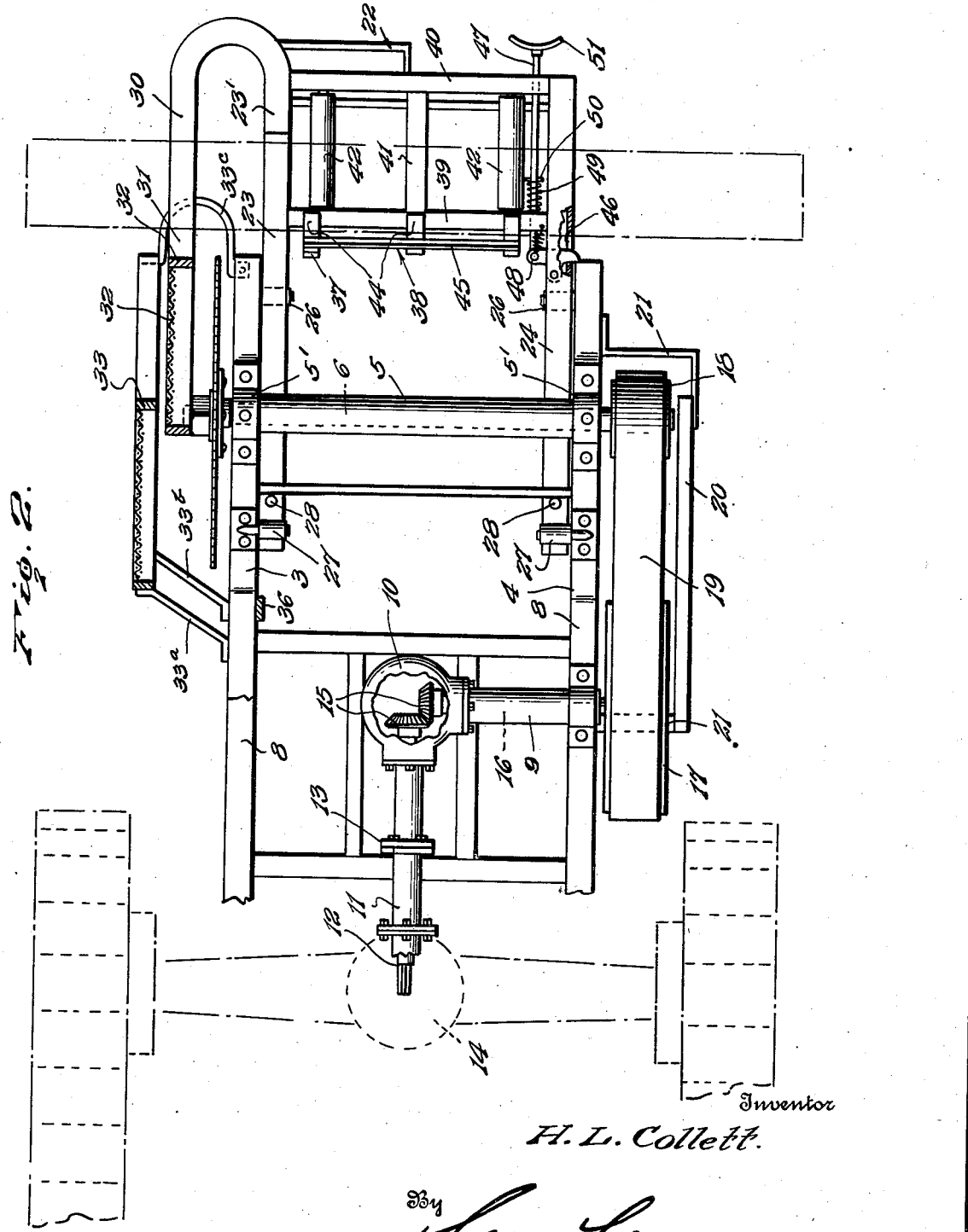

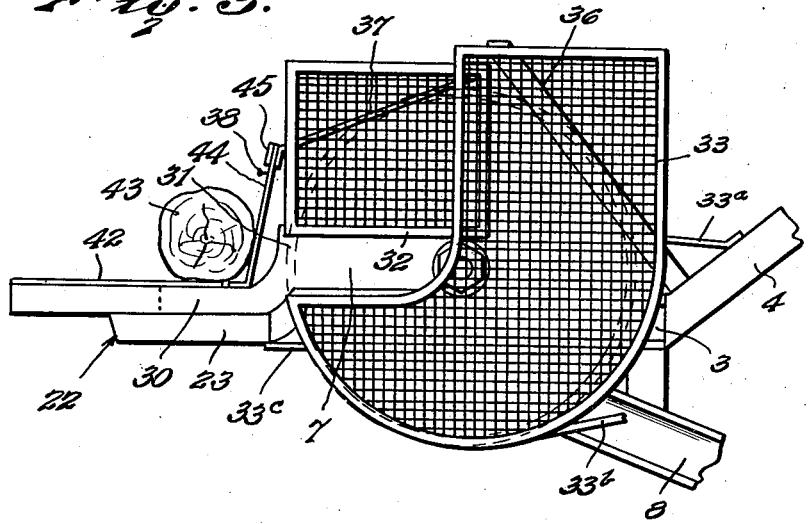
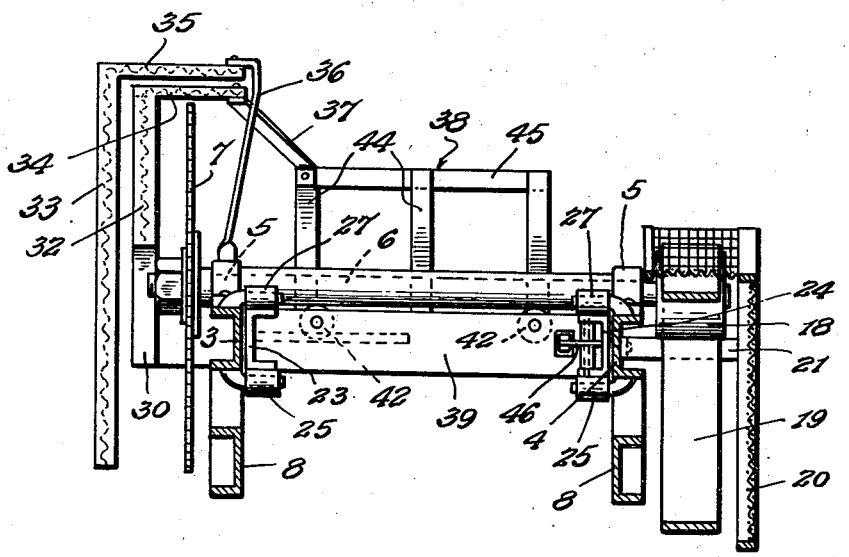

2,181,047

UNITED STATES PATENT OFFICE 2,181,047

WOOD SAW

Hubert L. Collett, Novinger, Mo.

Application May 2, 1938, Serial No. 205,606

2 Claims. (Cl. 143—43)

This invention relates to a wood saw of the rotary type, and it is one object of the invention to provide a saw adapted to be mounted at the back of a tractor. It will thus be seen that the saw may be applied to a tractor of a conventional construction and employed for cutting logs and the like into suitable lengths for use as fire wood or other purposes.

Another object of the invention is to provide a saw including a main frame adapted to be applied to the tractor and a log-holding carriage shiftable from an extended position to a retracted position and thus permit a log placed upon the carriage to be moved into position for cutting engagement by a circular saw carried by a shaft journaled in bearings provided upon the main frame.

Another object of the invention is to so form the carriage, that, when a log is placed thereon, it may be easily shifted transversely of the main frame to an extended position in which it is to be fed to the circular saw and in addition so form the carriage that by applying pressure to the log the carriage may be shifted along the main frame to advance the log towards the saw.

Another object of the invention is to provide the carriage with a side extension serving as means for supporting a projecting portion of the log and also as means for carrying a movable section of a guard or shield which protects the saw blade and prevents likelihood of a person being accidentally cut by the saw when standing at one side of the device.

Another object of the invention is to so form the guard or shield for the circular saw blade that it includes a stationary section mounted in a fixed position in shielding relation to the saw blade and a movable section carried by the side extension of the carriage and movable therewith relative to the stationary section of the shield.

It is another object of the invention to provide a saw wherein the main shaft carrying the rotary saw blade is rotated through the medium of a belt, a shield or guard being provided for the belt and pulley engaged thereby so that likelihood of a person being injured due to being caught between the belt and a pulley will be eliminated.

Another object of the invention is to provide a power saw which is of comparatively simple construction and very strong and durable and capable of being very easily applied to a tractor or removed therefrom.

The invention is illustrated in the accompanying drawings, wherein

Figure 1 is a side elevation showing the improved saw applied to a tractor,

Figure 2 is a top plan view of the improved saw,

Figure 3 is a view in elevation looking at the saw from the opposite side of that shown in Figure 1, and Figure 4 is a sectional view taken transversely through the saw along the line 4—4 of Figure 1.

The improved power saw constituting the subject-matter of this invention is intended to be detachably mounted at the rear of a tractor which is of a conventional construction and is indicated in general by the numeral 1. The main frame 2 of the saw has side bars 3 and 4, and to these side bars are secured bearings 5' at ends of a shaft housing 5 through which the shaft 6 carrying the saw blade 7 is rotatably mounted. Arms 8 extend forwardly from the side bars 3 and 4 at a downward incline, and one of these arms has secured to it a shaft housing 9 which extends transversely of the main frame between the arms and at its inner end is secured to a gear housing 10. A shaft housing or casing 11 extends forwardly from the gear housing 10 and through the shaft housing 11 extends a shaft 12. Fiber connections 13 are provided to prevent damage by vibrations. The shaft 12 projects from the forward end of this housing for operative engagement with the transmission 14 of the tractor. It will thus be seen that rotary motion may be imparted to the shaft 12 by the tractor, and as the shaft 12 which constitutes the drive shaft for the saw is rotated rotary motion will be transmitted from the shaft 12 through the medium of gears 15 to the shaft 16 which is journaled through the shaft housing or casing 9 and at its outer end carries a large pulley 17. A smaller pulley 18 is carried by the saw shaft 6 at the opposite end thereof from the blade 7 and about the pulleys 17 and 18 is trained a belt 19, by means of which rotary motion at increased speed is transmitted from the shaft 16 to the shaft 6. A guard or shield 20 is provided for the pulleys and the belt and consists of a metal frame carrying woven wire, as shown in Figures 1 and 4, and having mounting brackets or arms 21, by means of which it is mounted at the side of the main frame in shielding relation to the pulleys and the belt, as shown in Figures 1 and 2.

An auxiliary frame or carriage, indicated in general by the numeral 22, extends longitudinally of the main frame and is provided with side bars 23 and 24 which have contacting engagement with the side bars of the main frame. The side bars 23 and 24 rest upon lower rollers 25 and 26 and are engaged by upper rollers 27 which are disposed over the lower rollers 25 and serve to prevent the side arms of the carriage from tilting out of proper engagement with the lower rollers. It will thus be seen that the carriage will be maintained in a horizontal position and may be very easily shifted longitudinally of the main frame. Abutments 28 extend upwardly from the side bars of the carriage and by engagement with a bracing bar 29 extending between the side bars 3 and 4 of the main frame limit outward shifting movement of the carriage. Therefore, the carriage may only be shifted rearwardly to the extended position shown in Figures 1 and 2 and cannot become entirely detached from the main frame or shifted rearwardly to such an extent that the forward end portions of the side arms 23 and 24 will move out of a position between the rollers 25 and 27.

The side bar 23 of the carriage is of greater length than the side bar 24 and has an extension 23' which is bent outwardly and then forwardly to provide an auxiliary arm 30 which is spaced outwardly from the side bar 23 in parallel relation thereto and terminates in an upwardly extending portion 31 carrying a frame 32 constituting a movable section of a guard or shield for the saw blade 7. This frame 32 or movable shield section carries wire mesh and is shifted longitudinally with the carriage 22 relative to a stationary shield section or frame 33 carried by the main frame of the saw. Brackets 33ª, 33ᵇ and 33ᶜ are provided to firmly hold the shield section 33 in place. Horizontally extending portions 34 and 35 are provided along upper ends of the movable section 32 and stationary section 33 of the saw shield, and upon referring to Figures 1 and 4, it will be seen that the horizontally extending portion 35 of the stationary shield section is braced by a bracing strip 36 having one end secured to the shield and its other end secured to the side bar 3 of the main frame. A brace 37 is also provided for the horizontal portion of the movable shield section 32 and this bracing strip extends rearwardly from the forward end portion of the movable shield section and has its rear end secured to an upper corner portion of a wall 38 forming part of a cradle constituting an element of the carriage. This cradle extends transversely of the carriage and has front and rear bars 39 and 40 which are secured at their ends to the side bars 23 and 24 and braced midway their length by a cross bar 41. Rollers 42 are rotatably mounted between the bars 39 and 40 adjacent opposite ends of the cradle and rotate in a direction transversely of the carriage in order that a log or other heavy piece of wood 43 resting upon the rollers may be easily shifted transversely of the carriage and have a portion extended across the side bar 23 and auxiliary support 30 in position to be cut by the saw blade 7 when the carriage is shifted forwardly. The forward wall 38 of the carriage is formed of strong metal and has vertically disposed arms or strips 44 which extend upwardly from the front bar 39 of the cradle at a forward incline and at their upper ends carry a strip 45 extending longitudinally of the cradle. The log 43 when set in place upon the carriage rests against the wall 38 and when the operator of the saw pushes against the log it will be held firmly against the wall and at the same time the carriage will be shifted forwardly so that the saw will cut through the portion of the log between the side bar 23 and the auxiliary support 30. During this forward movement the shield section 32 is carried forwardly with the carriage and thus advanced between the saw blade and the portion of the stationary shield section 33 which projects upwardly from the main frame. Therefore, the movable shield section will be maintained in shielding relation to the rotating saw blade when the carriage is in the extended position but as the carriage is advanced forwardly this section will move with it and not interfere with proper cutting of the log.

It is desired to prevent the carriage from being unintentionally shifted forwardly during placing of a log thereon or during shifting of the log transversely across the carriage. In order to do so, there has been provided a latch 46 which is pivotally carried by the side bar 24 of the carriage. An actuating rod 47 for the latch extends longitudinally of the carriage and is slidably engaged through the bars 39 and 40 with its inner or front end pivoted to the heel of the latch, as shown at 48. A spring 49 which is coiled about the rod or spring 47 and has one end abutting the bar 39 and its other end engaging a disk 50 carried by the stem urges the stem rearwardly to an extended position. Upon referring to Figure 2, it will be seen that, when the stem is in this position, the latch will be held in its operative position in which its bill projects outwardly from the outer side face of the side bar 24 of the carriage. When the latch is in its operative or extended position, the bill is in position to engage the rear end of the adjoining side bar 4 of the main frame and as the spring is strong enough to prevent the latch from being moved to its retracted position by light pressure, the carriage will be prevented from being shifted forwardly until pressure is intentionally applied to the disk or head 51 at the rear end of the rod or stem 47. This head or disk is so located that the operator of the saw may very easily apply pressure to the disk and shift the head forwardly to swing the latch to a releasing position while standing back of the carriage in position to push upon the log and force the carriage forwardly.

Having thus described the invention, what is claimed as new is:

1. In a saw structure, a main frame, a rotary saw shaft extending across the main frame and projecting from one side thereof, a saw blade carried by the projecting portion of said shaft, a carriage shiftable longitudinally of said main frame and having side bars, a cradle mounted between said side bars and including rollers rotatable in a direction transversely of the carriage, one side bar having a portion projecting laterally from the rear end of the carriage and then forwardly to provide an auxiliary supporting bar spaced outwardly from the carriage and the main frame and overlapping the saw blade, and a shield for the saw blade consisting of a stationary section carried by the main frame and an auxiliary section carried by the auxiliary supporting bar, extensions projecting inwardly from upper marginal portions of the shield section across the saw blade, and braces for said extensions connected with the main frame and the carriage.

2. In a saw structure, a main frame having side bars, a rotary saw shaft extending transversely across the main frame and projecting from one side thereof, a saw blade carried by the projecting portion of said shaft, a carriage shiftable longitudinally of the main frame and having side bars, means for releasably holding the carriage in an extended position consisting of a latch pivoted to one side bar of the carriage for engaging an adjoining side bar of the main frame, a stem for said latch slidable longitudinally of said carriage and projecting from the rear end thereof, a handhold at the rear end of said stem, and resilient means urging the stem rearwardly and normally maintaining the latch in position to engage the side bar of the main frame.

HUBERT L. COLLETT.